Patented Feb. 22, 1944

2,342,538

UNITED STATES PATENT OFFICE 2,342,538

METHOD OF COLLECTING QUINONE

Carlin F. Gibbs, Cuyahoga Falls, Ohio, assignor to The B. F. Goodrich Company, New York, N. Y., a corporation of New York No Drawing. Application August 8, 1941, Serial No. 405,997

2 Claims. (Cl. 260—396)

This invention relates to the manufacture of quinones and pertains specifically to the method of collecting quinones after their removal from the reaction mixture.

It has long been known that quinone may be produced by oxidizing aniline in the form of a solution of aniline sulfate. Various oxidizing agents have been used, among the most important of which, from a commercial standpoint, are mixtures of manganese dioxide or potassium dichromate with sulfuric acid. The reaction is usually carried out as a batch process, the product being removed by steam distillation either at normal or at reduced pressure after completion of the reaction. In general the quinone is not isolated as such, but is absorbed in an aqueous solution of hydroquinone to form the molecular compound quinhydrone. The latter may be either oxidized to give quinone, or reduced to give hydroquinone. Inasmuch as there is little commercial demand for quinone itself, hydroquinone is usually the end-product. The collection of pure quinone as it comes from the reactor, without absorption in a hydroquinone solution, is extremely difficult because of the tendency of the quinone to plug up the condenser as it solidifies. Solvents for quinone have been used in the condenser in an attempt to overcome the difficulty, but this method is not entirely satisfactory, for two reasons. First, large amounts of solvent must be used, for the condenser tends to plug up again as soon as the solution becomes saturated; and second, there are large solvent losses through the condenser because of the low pressures used in the steam distillation. If higher pressures are used, the temperature rises so high that there is considerable decomposition of the quinone in the reactor.

I have now discovered a method for collecting benzoquinone and other quinones which are volatile at reduced pressure which eliminates these difficulties. My new method comprises reacting the quinones with a sulfinic acid to form a sulfone. The sulfones produced are of great commercial value as stainless age-resisters for use in rubber compounds. My invention thus makes possible the production of valuable age-resisters at a lower cost because of the elimination of the additional step of isolating the quinones, and also obviates the difficulties mentioned above which are attendant upon the isolation of the pure quinones. Since the reaction is rapid, even at room temperatures, no difficulty is experienced in carrying it out at the temperatures prevalent in the condenser—that is, temperatures slightly below the boiling point of water at the pressure used. The sulfinic acid should be present largely in the form of solution, although it need not all be dissolved. Any solid material present will go into solution as the reaction proceeds. The solvent used should be a good solvent for the quinone, and should preferably be miscible with water, so that the steam coming over with the quinone will not form a separate layer and prevent complete reaction. The boiling point of the solvent should preferably be at least as high as that of water, in order to avoid excessive losses when the quinone-steam mixture is introduced. However, by keeping the vessel containing the sulfinic acid solution at a temperature below that of the reactor in which the quinone is produced, a solvent with a boiling point somewhat above that of water may be used. A pressure differential between the two vessels will also aid in decreasing solvent losses. Suitable solvents include, among others, water ethylene glycol, diethylene glycol, 2-methoxy ethanol, 2-ethoxy ethanol, 1,4-dioxane, 2-(betamethoxyethoxy) ethanol, 2-(beta-ethoxyethoxy) ethanol, furfurol, tetrahydrofurfurol, and the like.

It is not necessary that the sulfone remain in solution because when it precipitates it does not tend to plug up the condenser inlet but settles to the bottom of the container. Since the reaction goes to completion even at room temperature without any excess of either reagent, the precise amount of sulfinic acid used for any given amount of quinone is not important so long as there is sufficient present to react with all the quinone.

Any organic sulfinic acid, alkyl or aryl, may be used, such as ethane sulfinic acid, propane sulfinic acid, hexane sulfinic acid, cyclo-hexane sulfinic acid, benzene sulfinic acid, p-toluene sulfinic acid, alpha or beta naphthalene sulfinic acid, alpha or beta tetrahydronaphthalene sulfinic acid, and the like. Substituted sulfinic acids such as p-chlorobenzene sulfinic acid, o-chlorobenzene sulfinic acid, p-nitrobenzene sulfinic acid, o-nitrobenzene sulfinic acid, 2-methyl-4-chlorobenzene sulfinic acid, p-phenol sulfinic acid, and similar compounds may also be used.

As a specific example of my invention I have carried out the following process. To a mixture of 23 g. of manganese dioxide, 70.5 g. of sulfuric acid, and 73 g. of water in a suitable reactor maintained at a temperature of about −5° to +5° C., are added with constant stirring over a period of about six hours, 92 g. of finely-divided manganese dioxide and a solution of 46.5 g. of aniline and 140 g. of sulfuric acid in 470 g. of water.

After the reactants are completely added the stirring is continued at the same low temperature for ten or twelve hours. The contents of the reactor are then steam-distilled at a pressure of 40 mm. of mercury, passing the quinone-steam mixture into a solution of 75 g. of p-tolune sulfinic acid in a mixture of about 750 ml. of water and 750 ml. of 2-ethoxy ethanol. About four hours are required for the completion of the distillation.

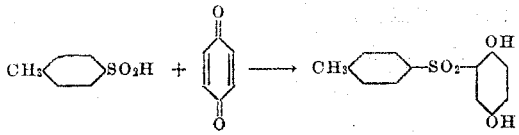

The yield is about 104 g. of 2,5-dihydroxyphenyl-p-tolyl sulfone. Similar results may be obtained with other sulfinic acids.

Instead of waiting until the oxidation reaction is completed before removing the quinone, it may be removed continuously during the reaction and absorbed in a sulfinic acid solution. As a specific example of this process, I have carried out the following reaction. A mixture of 11.6 g. of manganese dioxide and 36 g. of 50% sulfuric acid is placed in a suitable reactor which is maintained at a temperature of 50° to 60° C. by means of a water bath. A mixture of 58.8 g. of manganese dioxide, 50 g. of sulfuric acid, and 40 g. of water is added over a period of about one hour concurrently with a mixture of 24 g. of aniline, 140 g. of 50% sulfuric acid, and 165 g. of water. The pressure inside the reactor is maintained at about 40 mm of mercury, and a constant stream of water vapor is passed into the bottom of the reactor. The stream of water vapor, although not essential, speeds up the process substantially. The quinone-water vapor mixture is passed into a water-cooled receiver containing a solution of 40 g. of p-toluenesulfinic acid in a mixture of about 400 ml. of water and 400 ml. of 2-ethoxy ethanol. A yield of about 53 g. of 2,5-dihydroxyphenyl p-tolyl sulfone is obtained.

This method may also be used to collect other quinones, such as toluquinone, pseudocumoquinone, the xylyl quinones, the naphthoquinones, and any other quinone which is volatile at reduced pressure either with or without the presence of a stream of water vapor. Any of these quinones will react with any of the aforementioned sulfinic acids provided that there are not more than three substituent groups in the benzoquinones.

Although I have herein disclosed specific embodiments of my invention, I do not intend to limit myself thereto, but only as indicated by the appended claims.

I claim:

1. In the manufacture of quinones which are volatile at reduced pressure for use as intermediates in the manufacture of sulfones, the step which comprises distilling the quinone from the reaction mixture at reduced pressure and passing it into a solution of p-toluene sulfinic acid in 2-ethoxy ethanol.

2. In the manufacture of quinones which are volatile at reduced pressure for use as intermediates in the manufacture of sulfones, the step which comprises distilling the quinone from the reaction mixture at reduced pressure and passing it into a solution of an organic sulfinic acid in 2-ethoxy ethanol.

CARLIN F. GIBBS.